W. J. TOWNE.
Tree-Protector.
No. 44,238.
Patented Sept. 13, 1864.
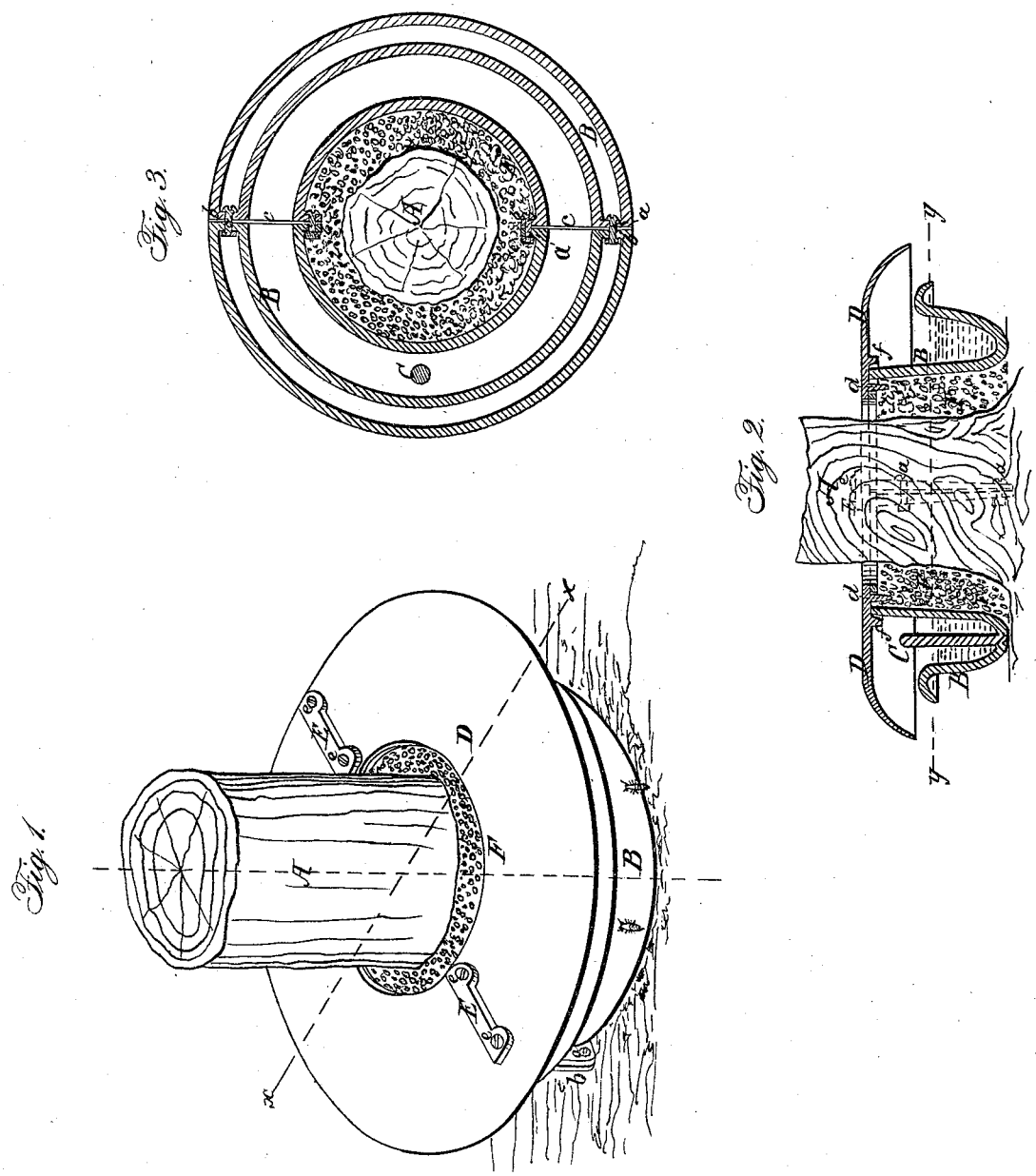
Witnesses:
Inventor:

UNITED STATES PATENT OFFICE.

WM. J. TOWNE, OF NEWTON, MASSACHUSETTS.

TREE-PROTECTOR.

Specification forming part of Letters Patent No. 44,238, dated September 13, 1864.

*To all whom it may concern:*

Be it known that I, WILLIAM J. TOWNE, of Newton, in the county of Middlesex and State of Massachusetts, have invented certain new and useful Improvements in Apparatus for Protecting Trees from Canker-Worms and other Insects, of which the following is a full, clear, and exact description, reference being had to the accompanying drawings, making part of this specification, in which—

Figure 1 is a view of my improved protector as applied to a tree. Fig. 2 is a central vertical section on the line $x\,x$ of Fig. 1. Fig. 3 is a section on the line $y\,y$ of Fig. 2.

Various contrivances have been devised for preventing canker-worms and other insects from ascending the trunks of trees and destroying their foliage; but no plan has yet met with the desired success. One of the most common kinds of tree-protectors in use is a trough formed in two or more sections secured together by ribs or flanges which separate the trough into two divisions. An elastic cover or apron of cloth is secured down around the entire periphery of the outer edge of the trough, which is then suspended from the trunk at the proper height by extending the upper edge of the apron around the trunk and securing it in place. This arrangement was inconvenient on account of the difficulty of examining the trough for the purpose of removing the worms and cleaning it before refilling with fresh liquid, as it became necessary to take the sections apart before doing so. It was also found ineffective in trapping the worms, on account of the ribs connecting the sections coming inside the trough, which thus formed bridges for the insects to cross on and ascend the tree.

My invention consists of a trough formed of two or more sections, which are united around the tree by means of screws passing through flanges on the outside, and provided with a cover, which rests upon the top of the inner edge of the trough, whose diameter is sufficiently large to leave a space between it and the tree to allow of the growth of the tree, and this cavity being packed with lime or other substance through which the insects cannot penetrate, and the trough filled with coal-oil or other liquid destructive to the insects, it becomes impossible for them to climb the trunk of the tree.

To enable others skilled in the art to understand and use my invention, I will proceed to describe the manner in which I have carried it out.

In the said drawings, A is the tree; B, the trough, of cast-iron or other suitable material, formed in two sections and connected together by screws $a$, passing through ribs or flanges projecting from the outside at $b\,b$. A packing, $c$, is placed between the joints of the trough to prevent leakage, said packing being of lead when the trough contains lye or acids, while putty may be used should the trough contain oil.

C is a plug, which is made to fit a hole in the bottom of the trough, and can be removed when it is necessary to draw off the liquid contents for the purpose of cleaning it.

D is a cover, which rests upon the inner edge of the trough, where it is kept in place by the pins $d$ on the cover fitting into corresponding holes on the upper surface of the inner edge of the trough. These pins may, however, project up from the inner rim of the trough and fit into corresponding holes in the cover, if desired. This cover is also made in two sections, which are secured together by screws $e$ passing through the laps E, thus protecting the trough from exposure to rain and preventing it from being clogged with leaves. A flange, $f$, is formed on the under side of the cover and projects over the inner edge of the trough, which more effectually keeps the cover in its place. The diameter of the inner edge of the cover and that of the trough is sufficiently large to allow of the growth of the tree, and the space F between said edge and the tree is packed closely with any substance—such as lime, wood-ashes, waste soda, &c.—through which the insects cannot penetrate.

I will now describe the manner of applying my improved apparatus to a tree.

Where the trunk of the tree rises from the ground in nearly a vertical direction, the earth being leveled off, the sections of the trough are united around the tree and placed securely in a horizontal position, when a packing of the nature above described is placed within the cavity F and the destructive liquid—such as coal-oil, lye, &c.—is poured into the trough and its cover attached thereto.

In case of the trunk being of so irregular a form at the surface of the ground as to be inconvenient to rest the trough on the ground, it may be supported higher up on any frame which will allow of the packing being placed between it and the tree. It will thus be seen that the packing within the space between the trough and the trunk of the tree being impenetrable to the insect, it may climb around the sides of the trough and up until it reaches the surface of the liquid contained in the trough, where it either abandons the attempt to cross or is destroyed in so doing. In the event of the trough being filled with insects, so that others can cross by creeping over them, they will still find it extremely difficult to go up the tree, because of the peculiar form of the cover and its resting on the inner edge of the trough.

When it is desired to examine the contents of the trough or remove the insects therefrom it is simply necessary to raise the cover, when it may be cleaned with facility.

What I claim as my invention, and desire to secure by Letters Patent, is—

The trough B, in combination with the cover D, attached to the rim of the inner edge of the trough, substantially in the manner and for the purpose set forth.

WM. J. TOWNE.

Witnesses:
  N. W. STEARNS,
  P. E. TESCHEMACHER.